United States Patent
Zusack et al.

[19]

[11] Patent Number: 5,931,317
[45] Date of Patent: Aug. 3, 1999

[54] GOLF RANGE FACILITATOR

[76] Inventors: Michael R. Zusack, 110 Stonebriar Blvd., Jupiter, Fla. 33458; Robert M. Svenson, 997 SW. South Globe Ave., Port St. Lucie, Fla. 33953

[21] Appl. No.: 09/008,934

[22] Filed: Jan. 20, 1998

[51] Int. Cl.$^6$ .................................................. A63B 55/00
[52] U.S. Cl. ..................... 211/70.2; 211/14; 211/85.7; 473/282; 473/405
[58] Field of Search ................................ 211/12, 13, 14, 211/60.1–70.2, 85.7; 473/282, 405

[56] References Cited

U.S. PATENT DOCUMENTS

| | | | |
|---|---|---|---|
| D. 304,750 | 11/1989 | Fitton et al. . | |
| D. 363,849 | 11/1995 | Bruns et al. . | |
| 1,625,856 | 4/1927 | Judd | 211/14 |
| 2,071,356 | 2/1937 | Pagett . | |
| 3,612,261 | 10/1971 | Cicero | 206/37 |
| 4,141,558 | 2/1979 | Hoffman . | |
| 4,177,996 | 12/1979 | Chang . | |
| 4,439,884 | 4/1984 | Giorni | 211/70.2 X |
| 4,464,072 | 8/1984 | Norwell | 401/137 |
| 4,995,614 | 2/1991 | Tange . | |
| 5,071,131 | 12/1991 | Turnbridge et al. | 273/201 |
| 5,259,622 | 11/1993 | Irving . | |
| 5,467,574 | 11/1995 | Thomsen . | |
| 5,492,384 | 2/1996 | Tarko et al. | 211/70.2 X |
| 5,564,605 | 10/1996 | Heidbreder | 222/192 |
| 5,573,122 | 11/1996 | Williams | 211/70.2 |
| 5,586,942 | 12/1996 | Wittek, Sr. et al. | 211/70.2 X |
| 5,597,363 | 1/1997 | Leote | 473/282 |
| 5,829,604 | 11/1998 | Brophy | 211/85.7 X |

*Primary Examiner*—Daniel P. Stodola
*Assistant Examiner*—Vestan Bo Booth
*Attorney, Agent, or Firm*—McHale & Slavin

[57] ABSTRACT

A golf equipment organizing device for use at a golf range. The device provides organized storage of items used during a practice session. The device operates as a storage unit for over two hundred golf balls. Release of the golf balls is controlled by a sliding cover shield connected to a spring-loaded handle. A water storage tank is located adjacent to the golf ball storage area and contained within the device housing. The device also includes a golf tee holder, a towel-holding hook, a club cleaner, a drink cup dispenser, and a waste receptacle.

18 Claims, 2 Drawing Sheets

GOLF RANGE FACILITATOR

FIELD OF THE INVENTION

This invention is related to the sport of golf and, more particularly, to an apparatus for organizing items used on a golf course practice range.

BACKGROUND OF THE INVENTION

The game of golf is an activity enjoyed by individuals of all ages, making it one of the most popular outdoor sporting activities in the world. By way of background, golf is a game that requires an individual to utilize specially shaped clubs to propel a golf ball over a field of play known as a course or links. The object of the game is to advance the ball around the course using as few strokes as possible.

The specially shaped clubs are generally referred to as golf clubs. For accurate play and ease of use, golf clubs are made in various sizes. Additionally, golf clubs are constructed from an assortment of materials, in an array of shapes. The performance of a golf club is largely dependant upon club construction and player skill. For example, the angle of the club face and the angle of which an individual strikes the golf ball determines the trajectory of the ball. Successful use of the golf clubs requires a certain level of skill.

As with any sporting activity, increased performance is obtained through practice. For this reason, golfers who wish to improve their skills spend an extensive amount of time at a golf practice range. It is not uncommon for a professional golfer to use a golf practice range to hit hundreds of golf balls a day.

A problem with golf practice ranges is the amount of clutter that typically accompanies a practice session. For example, an individual who intends to hit a hundred golf balls typically will carry several golf clubs and a supply of tees. Additionally, since golf swinging is a physical event, other items, like drinking water, snacks, and hand-drying towels are also often desired during practice.

Many golf courses provide practice ranges near the clubhouse so that golfers may warm up before beginning a round of golf. Although this provision is convenient, the abundance of equipment generated by several players using the practice range simultaneously can be troublesome.

One of the most enjoyable aspects of golf is the well-manicured appearance of the grounds on which the game is played. The accumulation of golfing equipment at a practice range can result in an unsightly gathering of golfing items which can distract from the course. The clutter causes many golf course managers to locate practice ranges at remote locations. While this strategy may conceal the clutter, it is most inconvenient to the golfers. Often, golfers wish to warm up before a round of golf. The first hole on most courses begins near the clubhouse and transporting a large amount of equipment to a remote practice location can be burdensome.

In an effort to reduce practice range clutter, golf courses typically provide a variety of equipment-handling devices. For example, golf clubs holders are often used to prevent golf club handgrips from becoming moist. The holders angle a supported club upward to prevent the club's handgrip from touching the ground. Carrying baskets are also used as a means of carrying golf balls to the range. Once empty, these baskets are left at the range for later collection by course staff.

Patents have been granted for many golf practice aids. For example, U.S. Pat. No. 2,071,356 discloses a golf ball storage apparatus having a spiral shaped feeder for dispensing of golf balls.

U.S. Pat. No. 4,141,558 discloses a golf ball storing and dispensing apparatus. A feeder arm used for positioning of golf balls can be rotated away from the golfer.

U.S. Pat. No. 4,995,614 also discloses a device which allows dispensing of a single golf ball for practice purposes.

U.S. Pat. No. 5,259,622 discloses yet another golf ball teeing apparatus which allows dispensing of a single ball at a time.

U.S. Pat. No. 4,177,996 discloses a golf ball storage device and dispenser. Golf balls may be placed in a container that includes an internal spiral track designed to eliminate clogging tendencies.

U.S. Pat. No. 5,467,574 discloses a golf ball stacking and carrying device which dispenses golf balls in such a manner that they remain organized for immediate usage.

U.S. Pat. No. 5,492,384 discloses a combination golf equipment carrier and range stand. This device includes a triangular shaped housing. Golf clubs may be secured to sidewalls of the device, eliminating the need for carrying of a golf club bag. The inner wall forms a compartment for objects and is shaped to prevent dislodgement of the objects during transporting.

U.S. Pat. No. 5,573,122 is a golf club organizer which includes a pin for placement of a hand towel, an umbrella holding tool, and a golf ball dispenser.

U.S. Design Pat. No. 304,750 discloses an ornamental design for a golf ball dispenser. This device simply allows golf balls to be placed within a chamber and withdrawal made by movement of a handle.

U.S. Design Pat. No. 363,849 discloses a golf club support stand and towel holder.

What is lacking in the art is a golf range organizer that incorporates the advantages of the prior art, while addressing the shortcomings exhibited thereby. The device should store and dispense large numbers of golf balls with ease. The device should also store and dispense water, while providing drinking cups and a waste receptacle therefor. The device should facilitate easy cleaning of golf clubs and temporarily store golf clubs in a vertical orientation for ease of access. The device should also be easy to transport and include a base for stability when not in motion.

SUMMARY OF THE INVENTION

The present invention is an apparatus having a specific application for organizing equipment used on golf course practice ranges. The apparatus has an aesthetically pleasing shape that provides a unique combination of storage functions. The device provides this combination while providing a high degree of mobility and transportation ease.

The device includes a golf ball storage area designed to hold between two and three hundred golf balls. A cover shield attached to a spring-loaded handle permits orderly golf ball release as needed. The cover shield is advantageously shaped to dislodge balls that may have become wedged together in the storage container.

The device includes a hinged, dome-shaped lid to allow a large volume of golf balls to be placed within the storage area. The lid includes a transparent viewing window that allows inspection of the storage container contents, without opening the lid. The viewing window is also hinged to advantageously allow golf balls to be loaded into the domed upper portion of the storage container, while the lid, itself, is shut.

The device includes golf club clamps that suspend golf clubs in a vertical orientation. These clamps protect the club grips and club heads from ground moisture. An included golf club head washer allows a golfer to remove accumulated dirt from the golf club heads. Because the golf club head washer is positioned beneath a water spigot, wet washing of clubs is easily performed. The water spigot may also be used to dispense water from an included water storage tank for drinking or filling of the head washer. The water storage tank is housed within a dedicated compartment in the storage area; the spigot is attached to the water storage tank and extends through a side wall of the compartment. A cup dispenser and waste receptacle are also included. An externally-mounted tee holder stores and holds tees securely in any position. The result is an apparatus capable of storing and transporting golf practice equipment in an organized manner.

Thus, an objective of the instant invention is to disclose a golf course practice range organizing apparatus that can be easily moved onto or removed from the range.

Another objective of the instant invention is to disclose an organizing apparatus that maintains golf clubs in an upright position to prevent moisture from contacting the golf club grips and further allowing clean club heads to be dried without touching the ground.

Yet another object of the instant invention is to provide a golf ball dispenser having the ability to store over two hundred golf balls, thereby eliminating the need for multiple golf ball storage baskets.

Still another object of the instant invention is to provide a concealed water tank that is shielded from sunlight and insulated by golf balls placed in an adjacent compartment.

Still another object is to provide a viewing window that allows individuals to quickly determine the amount of golf balls and water remaining within the apparatus, while allowing storage in the uppermost portions of the device.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
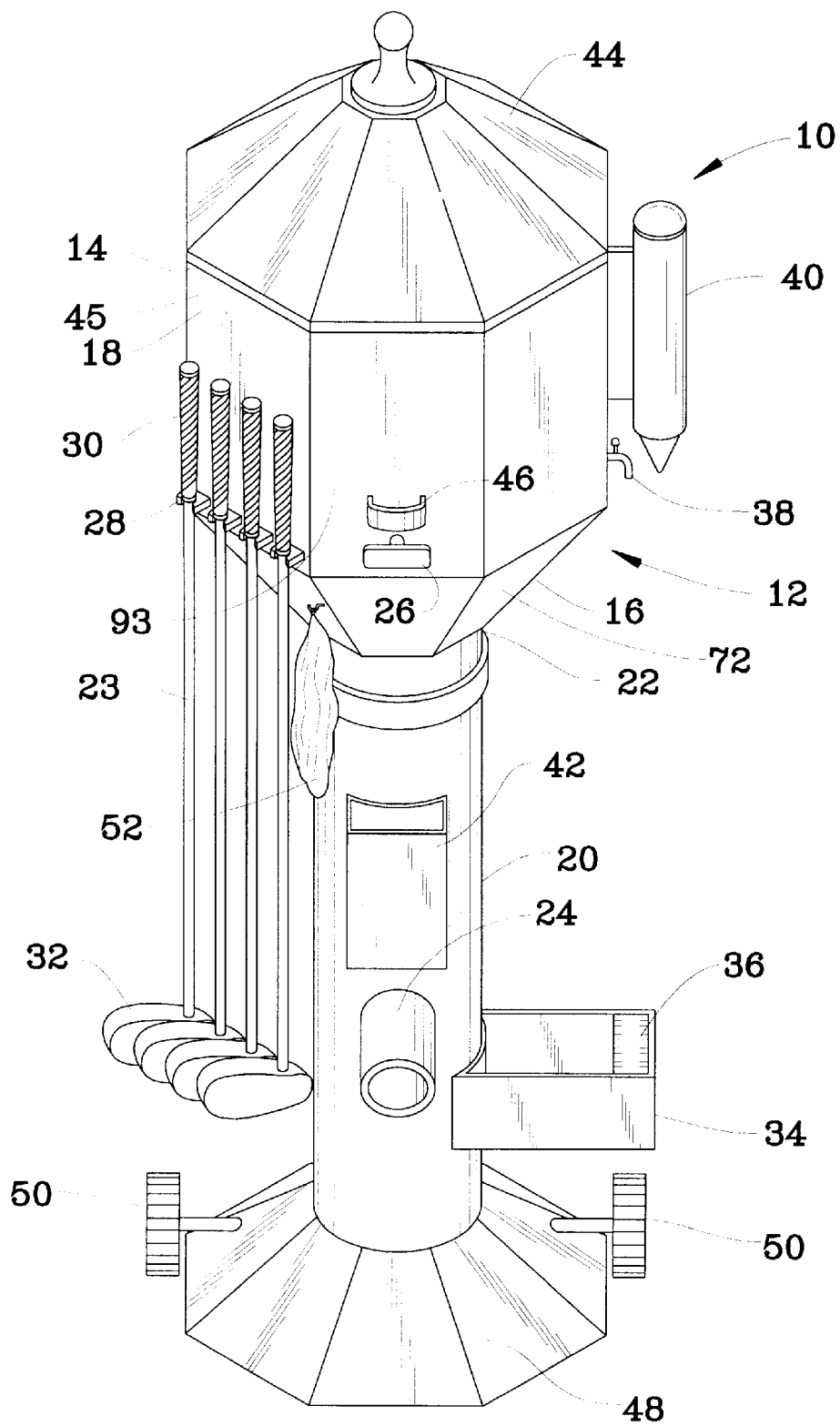
FIG. 1 is a perspective view of the present invention.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Now referring to FIG. 1, set forth is a perspective view of the golf range organizing device 10 of the present invention. The device 10 includes a main container 12 that is bounded by an upper rim 14, a bottom section 16, and a sidewall 18. The container 12 is divided by a separating wall 88 into two main regions: a golf ball storage area 70 and a water storage area 71.

The container 12 rests on a support stand 20. An upper portion 22 of the support stand 20 abuts the bottom of the section 16 and maintains the container at a fixed height above the ground. With additional reference to FIGS. 2 and 3, a golf ball dispenser means 25 facilitates gravity-induced release of golf balls from the storage area 70 through a delivery member 76 and exit chamber 24. Operation of the dispensing means 25 is controlled by a spring-loaded handle 26.

Golf club clamps 28 extend orthogonally from the container sidewall 18 and selectively secure golf clubs 23 along the outside of the device 10. The golf club clamps 28 allow golf club grips 30 to remain dry. The clamps 28 also advantageously prevent club heads 32 from scraping the ground when the device 10 is moved.

A golf club brush 34 extends from the exterior of the support stand 20. The brush 34 includes bristles 36 collected in a club-head-encircling pattern. Passing a club head 32 through the brush 34 places bristles 36 on either side of the club head and loosens dirt from the club after usage. The club brush 34 is advantageously positioned beneath the water spigot 38 so that stored water may be poured directly onto the bristles 36 or club head 32.

So that water dispensed from the spigot 38 may be used for refreshment purposes, a drinking cup dispenser 40 is mounted on the container sidewall 18. A waste receptacle 42 also extends from the support stand 20 and allows convenient disposal of spent drinking cups and other waste material.

The container lid 44 is hingedly coupled to the upper rim 14 and conceals the storage areas 70,71 when closed. Opening the lid 44 provides simultaneous access to the golf ball storage area 70 and the water storage area 71.

The container sidewall 18 is preferably formed from a series of eight panels 45 joined to give the container 12 an octagonal cross section. The container may be made from any number of panels 45, as design choice dictates. The panels 45 are flat and provide mounting surfaces for the golf club clamps 28, the water spigot 38, and the cup dispenser 40. For example, the golf club clamps 28 extend from two adjacent panels 90,92. The spigot 38 and cup dispenser extend from a panel 84 that borders the water storage area 71. A golf tee holder 46 extends from a front panel 93. Towel rack 52 provides for club and/or hand drying.

The bottom of the support stand 20 has an enlarged base 48 for stability. Wheels 50 facilitate easy transportation of the device 10 and equipment stored thereby. As a result, the device 10 and equipment may be moved quickly between various locations about a golf course or practice range. The wheels 50 also allow transferral of the device 10 by golf course staff to accommodate mowing or security needs.

Figure 2:
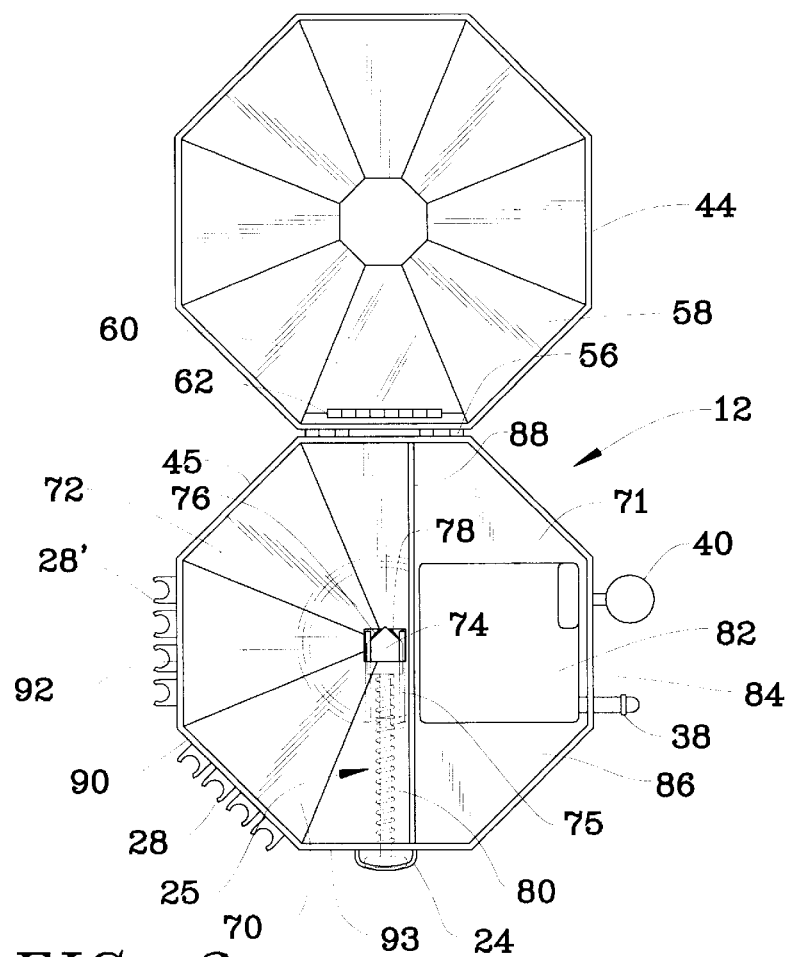
FIG. 2 is a top plan view of the apparatus with the lid in an open position and the ball dispenser in a closed position.

Now referring to FIG. 2, a top view of the container 12 is depicted with the lid 44 placed in an open position by use of lid hinge 56. The lid 44 is formed from eight individual slats 58, forming a pitched octagonal dome. The lid 44 includes one transparent slat 60. The transparent slat 60 provides a window through which the contents of the storage areas 70,71 may be examined. The transparent slat 60 is mounted on slat hinge 62 and may be opened as needed. Opening the transparent slat 60 provides access to the storage areas 70,71. As a result, additional items, such as extra golf balls, may be placed into the container 12 without opening the lid 44. The pitched nature of the container lid 44 provides the container 12 with increased storage space, and the hinged transparent panel 60 allows the container to be filled to maximum capacity. This design advantageously allows new golf balls to be added to the golf ball storage area 70 without spilling golf balls already loaded therein.

The bottom of the container 12 is characterized by sloped lower walls 72. The lower walls 72 extend at an angle downward from bottom edges of the sidewall panels 45. Additionally, the golf ball storage area includes a set of angled inner walls 73. Collectively, the inner walls 73 act as a ramp that guides golf balls to the entrance of the delivery member 76.

The delivery member 76 is an essentially-hollow tube extending from below the storage areas 70,71 down to an exit chamber 24. The exit chamber 24 is a downwardly-slanted tube that passes through the outer wall of the support stand 20.

Golf ball release is controlled by a cover shield 74 attached to a spring-loaded positioning handle 26. The cover shield 74 is an essentially-rectangular block slidably mounted on a shield track 75. The cover shield 74 includes a leading edge 78 that selectively covers the entry to the delivery member 76. The cover shield leading edge 78 is pointed to dislodge golf balls that may have clogged the entrance of the delivery member 76, during use. The dispenser means 25 includes a biasing spring 80 that urges the cover shield 74 into a closed position. When in a closed position, the cover shield 74 seals the entrance to the delivery member 76 and prevents golf ball release. When the cover shield 74 is pulled to an open position, golf balls in the storage area 70 are released into the delivery member 76. The golf balls then travel down the delivery member 76 and pass through the exit tube 24, ultimately landing on the ground beside the base 48 of the support stand 20.

The water storage area 71 of the container 12 houses a water storage tank 82 and is foam-filled to insulate the tank. The above-mentioned water spigot extends from the water storage tank 82 and passes through the sidewall panel 84. The storage tank 82 rests upon a horizontal support floor 86 formed within the water storage container 71. It is noted that the floor 86 and the separating wall 88 provide sufficient space to allow water tanks 82 of various size, as needed. The separating wall 88 may be moved to provide a larger or smaller golf ball storage area 70, as needed.

Figure 3:
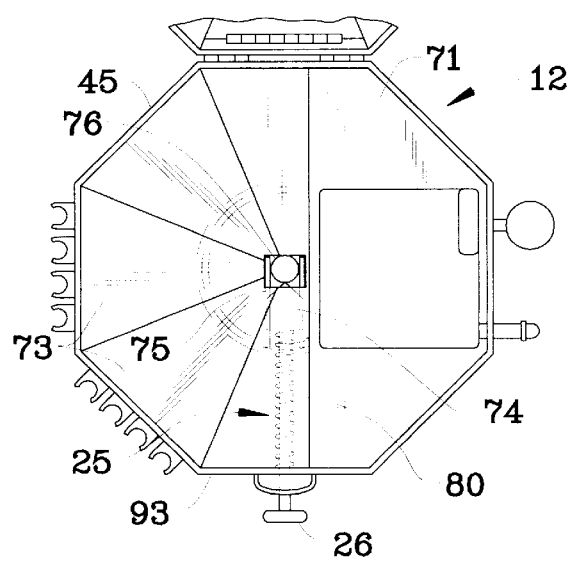
FIG. 3 is a top plan view of FIG. 2 depicting a ball dispenser in an open position.

FIG. 3, illustrates the top view of the container 12 with the cover shield shown retracted into an open position. Pulling the positioning handle 26 to move the cover shield 74 into this open position compresses the biasing spring 80 and exposes the entrance to the golf ball delivery member 76. The delivery member is preferably a four-inch-diameter pipe which leads through the support stand directly to the exit chamber 24, allowing a high volume, yet controlled, golf ball release upon demand.

Figure 4:
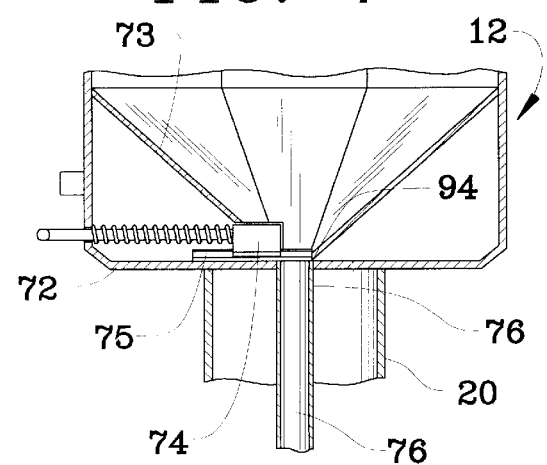
FIG. 4 is a cross-sectional side view illustrating the ball dispensing mechanism.

With reference to FIG. 4, the entrance to the delivery member 76 is uncovered when the cover shield 74 is retracted. Release of the spring-loaded positioning handle 26 returns the cover shield 74 to a closed position.

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

What is claimed is:

1. A golf range organizer comprising:
   a container having an open top bounded by a rim, a bottom, and a continuous side wall forming a golf ball storage area;
   a support stand having an upper portion secured to the bottom of said container for maintaining said container a raised position, said support stand having a golf ball delivery member for communication with said golf ball storage area to receive said stored golf balls therefrom for delivering golf balls along a lower portion of said support stand;
   a dispenser means for releasing an operator-controlled number of golf balls through said delivery member;
   a removable water tank positioned on a shelf within said container, said water tank having a spigot extending through said side wall of said container;
   a lid hingedly coupled to said rim for concealing said golf ball storage area and said water tank while in a closed position and providing access to said golf ball storage area and said water tank when said lid is in a raised position; and
   a plurality of golf club clamps sized and positioned to secure individual clubs to said container in a vertical orientation.

2. The golf range organizer according to claim 1 wherein said lid is constructed from slats forming an octagon dome.

3. The golf range organizer according to claim 2 wherein one of said slats is a hinged viewing pane.

4. The golf range organizer according to claim 1 wherein said dispenser means is further defined as a shield slidably positioned to selectively cover an entrance to said delivery member, said shield biased in a closed position with each side edge secured within a track member.

5. The golf range organizer according to claim 4 wherein said shield includes an angular-shaped leading edge, whereby said leading edge will dislodge golf balls that have clogged said delivery member.

6. The golf range organizer according to claim 1 wherein said continuous side wall of said container is constructed from a plurality of slat walls forming an octagonal shape, said slat walls providing a mounting surface for said golf club clamps.

7. The golf range organizer according to claim 1 including a drinking cup dispenser mounted adjacent to said water spigot.

8. The golf range organizer according to claim 1 including a golf tee holder.

9. The golf range organizer according to claim 1 including a waste receptacle secured to said support stand.

10. The golf range organizer according to claim 1 including a brush having bristles sized and positioned to clean a golf club head.

11. A golf range organizer comprising:
    a container having an open top bounded by a rim, a bottom, and a continuous side wall constructed from a plurality of slat walls forming an octagon shape forming a golf ball storage area;
    a support stand having an upper portion secured to the bottom of said container for maintaining said container a raised position, said support stand having a golf ball delivery member for communication with said golf ball storage area to receive said stored golf balls therefrom for delivering golf balls along a lower portion of said support stand;
    a dispenser means for releasing an operator-controlled number of golf balls through said delivery member;

a removable water tank disposed on a shelf within said container, said water tank having a spigot extending through said side wall of said container;

a drinking cup dispenser mounted adjacent to said water spigot;

a lid hingedly coupled to said rim for concealing said storage area and said water tank while in a closed position and providing access to said storage area and said water tank when said lid is in a raised position, said lid is constructed from slats forming an octagon dome; and a plurality of golf club clamps sized and positioned to secure individual clubs to said container in a vertical orientation.

12. The golf range organizer according to claim 11 wherein one of said slats is a hinged viewing pane.

13. The golf range organizer according to claim 12 wherein said dispenser means is further defined as a shield slidably positioned to selectively cover an entrance to said delivery member, said shield biased in a closed position with each side edge secured within a track member.

14. The golf range organizer according to claim 11 wherein said shield includes an angular shaped leading edge, whereby said leading edge will dislodge golf balls that have clogged said delivery member.

15. The golf range organizer according to claim 11 including a golf tee holder.

16. The golf range organizer according to claim 11 including a waste receptacle secured to said support stand.

17. The golf range organizer according to claim 11 including a brush having bristles sized and positioned to clean a golf club head, said brush being mounted beneath said spigot.

18. The golf range organizer according to claim 11 including a towel-holding hook.

* * * * *